Nov. 8, 1938.                N. C. McBIRNEY                2,135,782
                                  PIEPAN
                           Filed Oct. 10, 1936
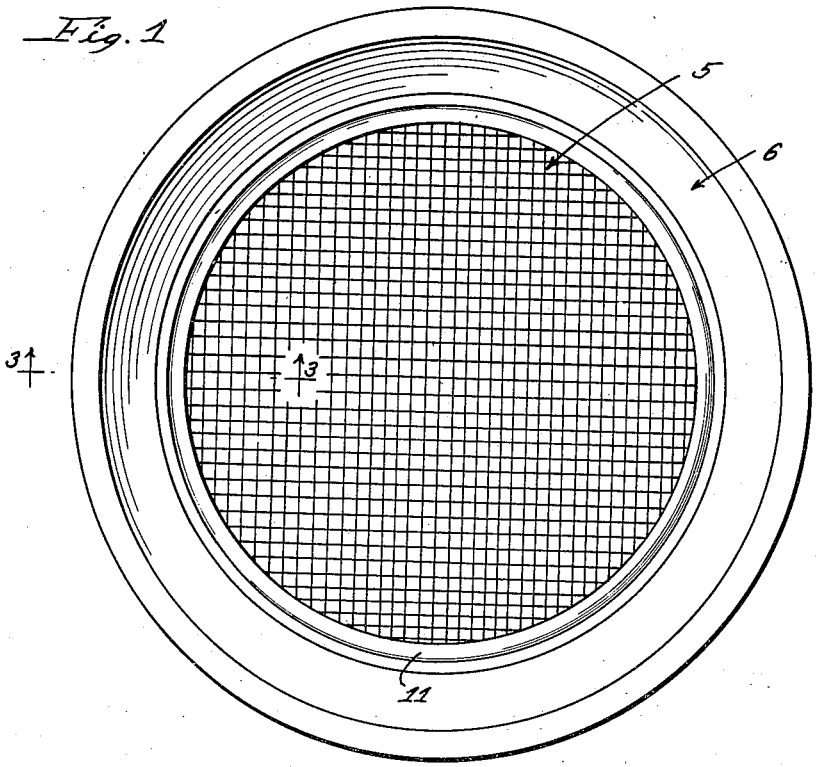
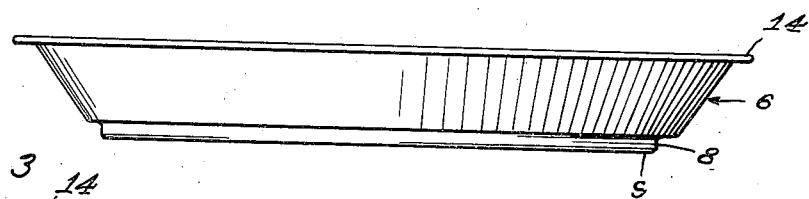
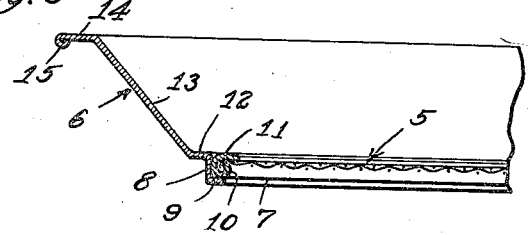
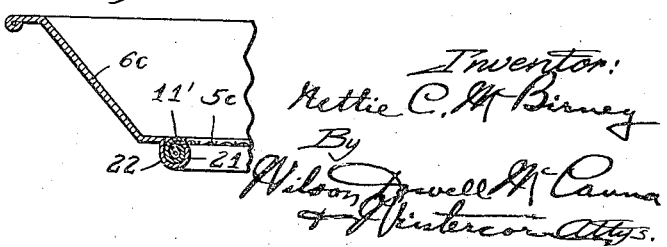

Patented Nov. 8, 1938

2,135,782

UNITED STATES PATENT OFFICE 2,135,782

PIEPAN

Nettie C. McBirney, Tulsa, Okla.

Application October 10, 1936, Serial No. 104,929

7 Claims. (Cl. 53—6)

This invention relates to a new and improved pie pan.

Efforts have been made to improve the construction of pie pans by using wire screen instead of sheet metal or glass, but so far as I am aware there has never been anything truly successful developed along those lines. That is to say, while the use of wire to allow the pie to bake from both top and bottom, by virtue of the free circulation of air, assures one of a crispy, well done crust in reduced cooking time, the mechanics of incorporating the wire have not been properly worked out heretofore, with the result that a pie baked in such pans would not have a firm upstanding side wall, and the pieces of pie would be "loppy". It is therefore the principal object of my invention to provide a pie pan incorporating a wire bottom in a sheet metal pin, as distinguished from a wire article reinforced with a sheet metal flange, or some other type of framework, like those proposed heretofore, whereby to retain all of the advantages flowing from the wire construction without suffering the disadvantages mentioned.

Another object of my invention is to provide a pie pan of novel construction which, regardless of the wire incorporated therein, is just as rigid and durable as the ordinary unimproved pan, and just as easy to wash and dry.

My invention is illustrated in the accompanying drawing, in which—

Figs. 1 and 2 are a top view and side view, respectively, of a pie pan embodying my invention;

Fig. 3 is a sectional detail on the line 3—3 of Fig. 1, and

Fig. 4 is a section similar to Fig. 3, showing another construction.

Similar reference numerals are applied to corresponding parts throughout the views.

Referring first to Figs. 1 to 3, it will be seen that I have inserted a wire bottom 5 in a sheet metal pan 6, thus retaining the rigidity of the ordinary one-piece sheet metal pan while obtaining the advantages going with the use of wire screen in an article of this kind. The sheet metal is simply punched out from the bottom of the pan 6, as at 7, and a downwardly projecting lower rim 8 is formed, flanged inwardly, as at 9, to define an annular ledge or shoulder 10 for the rim 11 of the wire bottom 5 to rest upon, the latter having the cut edges of the wire clinched therein in the curling of the sheet metal in the forming of the rim, and having a press fit inside the rim 8. The shoulder 10 is so spaced with respect to the annular shoulder 12 next to the side wall 13 of the pan that the rim 11 of the wire bottom will come substantially flush with the shoulder 12 when pressed home against the shoulder 10. The upper annular flange 14 defines a reenforcing rim for the pan, which, taken with the other rim 8, makes for the desired rigidity and avoids danger of the pan getting bent out of shape in service. The outer edge of the flange 14 is rolled, as at 15, to provide a rounded edge and also add further reenforcement. This pie pan will rest on the sheet metal flange 9, thus relieving the wire bottom 5 of that much wear and tear. The sheet metal of the pan may be tin, aluminum, or any other metal suitable for the purpose.

In use, it is apparent that the wire bottom 5 allows the pie to bake from both top and bottom, because of the free circulation of air, thus insuring one of a crispy, well done crust. Incidentally, I have found in using pans of this construction that the cooking time is reduced approximately twenty-five (25%) percent, so that an appreciable saving in pie baking is also realized. This free circulation of air is also of advantage because it is possible to keep a pie in a pan for an indefinite time without having that "close" flavor and moist undercrust that comes with standing in any pie pan, even the glass ones. The air circulation eliminates the possibility of a soggy crust, which it is the aim of every good cook to avoid. Now, by reason of the fact that I have retained the structure of an ordinary tin pie pan throughout the side walls down to the bottom of the pan and merely inserted the wire bottom, as herein disclosed, I have obtained all of the advantages going with the use of wire without sacrificing the structural strength and rigidity of the ordinary tin pan which a wire pan does not possess, even though reenforced in one way or another, as heretofore proposed. A pie baked in this pan will have a firm upstanding side wall, so that the piece of pie will not "lop" as it does in the case of an all-wire pan. Moreover, with my construction, the cost of production is kept to a minimum, so that this sheet metal pan with the wire bottom inserted is made available to the housewife at a small fraction of the cost of these other pie pans.

The form shown in Fig. 4 is similar to that of Figs. 1 to 3, but in this case the wire bottom 5c is clinched between the ring 11' and the lower rim 21 of the pan 6c, the rim 21 and ring 11' being curled up together under the wire bottom 5c, as shown. The bead 22 formed by these curled up parts supports the pan in the desired elevated relation to the rack in the oven. Generally speaking, a pan of this construction offers the same advantages as the one previously described; it retains the structural strength and rigidity of the ordinary all metal pie pan, and at the same time offers the advantages of a wire pie pan without the disadvantages to which previous pans of such construction have been subject.

I claim:

1. A pie pan of the character described comprising a main body frame formed to provide complete outwardly inclined upstanding side walls with an outwardly projecting rim on the upper edge and a downwardly projecting supporting rim on the lower edge having an inwardly projecting flange on the bottom thereof for direct slidable engagement with a suitable supporting surface, and a wire mesh bottom for said pan having a peripheral rim secured thereto and received with a friction fit inside said supporting rim and engaging the top of said inwardly projecting flange.

2. A pie pan of the character described comprising a main body frame formed to provide complete outwardly inclined upstanding side walls with an outwardly projecting rim on the upper edge, the bottom portion of said side walls being formed to provide an inwardly projecting annular shoulder with a downwardly projecting annular rim on the inner edge thereof and an inwardly projecting annular flange on the lower edge of the latter, and a wire mesh bottom for said pan having a peripheral rim secured thereto and received with a friction fit inside said downwardly projecting rim and engaging the top of said annular flange, said peripheral rim being disposed substantially flush with said annular shoulder.

3. A pie pan comprising a shape retaining sheet metal ring shaped body adapted to shape and support the side walls of a pie, the bottom of the pan being open and defined by a downwardly projecting supporting rim having an inwardly projecting flange on the bottom thereof, and a wire bottom closure for said pan having a shape retaining rim frictionally and removably entered inside the bottom rim of the pan and resting on the flange thereof.

4. A pie pan of the character described comprising a shape retaining circular sheet metal rim adapted to shape and support the side walls of the pie baked in the pan, a circular screen bottom to support the pie and permit air circulation to the bottom thereof, and a sheet metal ring around the periphery of the screen bottom fitting snugly in the bottom of the sheet metal rim, at least one of the last two mentioned parts being curled so as to clinch the edges of the screen bottom.

5. A pie pan of the character described comprising a shape retaining circular sheet metal rim adapted to shape and support the side walls of the pie baked in the pan, a circular screen bottom to support the pie and permit air circulation to the bottom thereof, and a sheet metal ring around the periphery of the screen bottom fitting in the bottom of the sheet metal rim, the last two mentioned parts being curled together whereby to clinch the edges of the screen bottom and also define an annular downwardly projecting pan supporting bead, for the purpose set forth.

6. A pie pan of the character described comprising a main body frame formed to provide complete upstanding side walls, the bottom portion of said side walls being formed to provide an inwardly projecting annular shoulder with a downwardly projecting annular rim on the inner edge thereof, a circular screen bottom to support the pie and permit air circulation to the bottom thereof, and a sheet metal ring around the periphery of the screen bottom fitting inside the downwardly projecting annular rim, at least one of the last two mentioned parts being curled so as to clinch the edges of the screen bottom, the sheet metal ring being disposed in substantially coplanar relation with the aforesaid annular shoulder on the bottom portion of the side walls.

7. A pie pan of the character described comprising a main body frame formed to provide complete upstanding side walls, the bottom portion of said side walls being formed to provide an inwardly projecting annular shoulder with a downwardly projecting annular rim on the inner edge thereof, a circular screen bottom to support the pie and permit air circulation to the bottom thereof, and a sheet metal ring around the periphery of the screen bottom fitting inside the downwardly projecting annular rim, the last two mentioned parts being curled together whereby to clinch the edges of the screen bottom and make the sheet metal ring on the screen bottom form a reinforcing core in the annular bottom rim of the pan, the sheet metal ring being disposed in substantially coplanar relation with the aforesaid annular shoulder on the bottom portion of the side walls.

NETTIE C. McBIRNEY.